US012729625B2

(12) United States Patent
Lai et al.

(10) Patent No.: US 12,729,625 B2
(45) Date of Patent: Sep. 8, 2026

(54) LUNAR REGOLITH PROCESSING SYSTEM FOR MINING AND BENEFICIATION

(71) Applicant: Interlune Corporation, Estes Park, CO (US)

(72) Inventors: Gary Lai, Seattle, WA (US); Harrison H. Schmitt, Albuquerque, NM (US)

(73) Assignee: Interlune Corporation, Seattle, WA (US)

( * ) Notice: Subject to any disclaimer, the term of this patent is extended or adjusted under 35 U.S.C. 154(b) by 421 days.

(21) Appl. No.: 18/544,610

(22) Filed: Dec. 19, 2023

(65) Prior Publication Data

US 2024/0200447 A1 Jun. 20, 2024

Related U.S. Application Data

(60) Provisional application No. 63/476,361, filed on Dec. 20, 2022.

(51) Int. Cl.
*E21C 51/00* (2006.01)
*B64G 4/00* (2006.01)
(Continued)

(52) U.S. Cl.
CPC ................ *E21C 51/00* (2013.01); *B64G 4/00* (2013.01); *C01B 23/0042* (2013.01); *C01B 2210/0031* (2013.01); *F25J 1/0007* (2013.01)

(58) Field of Classification Search
CPC ....... E21C 51/00; B64G 4/00; C01B 23/0042; C01B 2210/0031; F25J 1/0007
See application file for complete search history.

(56) References Cited

U.S. PATENT DOCUMENTS 4,938,946 A 7/1990 Gibson et al.
4,948,477 A 8/1990 Gibson et al.
(Continued)

FOREIGN PATENT DOCUMENTS

CN 106437720 A 2/2017
CN 210479070 U * 5/2020
(Continued)

OTHER PUBLICATIONS

Beike "Mining of Helium-3 on the Moon: Resource, Technology, and Commerciality—A Business Perspective," In: "Energy Resources for Human Settlement in the Solar System and Earth's Future in Space," Jan. 1, 2013, American Association of Petroleum Geologists, pp. 53-73.

(Continued)

*Primary Examiner* — Janine M Kreck
(74) *Attorney, Agent, or Firm* — Potomac Law Group, PLLC

(57) ABSTRACT

A mobile mining platform for operation on a lunar surface can excavate and deposit regolith into a mill. The mill can agitate at least a portion of the excavated regolith to release volatile gases from the portion of the excavated regolith, without heat being applied to the portion of the excavated regolith. A refinery can perform molecular separation of the released volatile gases. In some embodiments, pressure in the mill can be increased through introduction of a diluent gas into the mill, to improve the efficiency of pumping the released volatile gases from the mill to the refinery. In some embodiments, volatile liquids stored on the platform and/or generated by the refinery can be used to cool the released volatile gases prior to molecular separation of the released volatile gases. In some embodiments, the mill can separate and collect regolith material of different sizes for different uses.

20 Claims, 5 Drawing Sheets

(51) Int. Cl.
*C01B 23/00* (2006.01)
*F25J 1/00* (2006.01)

(56) References Cited

U.S. PATENT DOCUMENTS

| | | | | |
|---|---|---|---|---|
| 5,017,283 | A | 5/1991 | Oder | |
| 9,581,021 | B2 | 2/2017 | Ethridge et al. | |
| 2011/0168164 | A1* | 7/2011 | Zillmer | B64G 1/16 126/685 |
| 2016/0082478 | A1* | 3/2016 | Walton | B07B 1/24 209/288 |
| 2019/0271228 | A1 | 9/2019 | Sowers, Jr. et al. | |
| 2021/0310353 | A1 | 10/2021 | Aylmer | |
| 2021/0404338 | A1 | 12/2021 | Metzger et al. | |
| 2022/0025535 | A1 | 1/2022 | Loop | |

FOREIGN PATENT DOCUMENTS

| | | | |
|---|---|---|---|
| CN | 107355224 | B | 8/2023 |
| CN | 114684799 | B | 9/2023 |
| RU | 2055206 | C1 | 2/1996 |
| RU | 2353775 | C1 | 4/2009 |
| RU | 2680851 | C1 | 2/2019 |
| RU | 2701394 | | 9/2019 |
| WO | 2009055552 | A2 | 4/2009 |
| WO | 2020033561 | A2 | 2/2020 |
| WO | 2022055673 | A1 | 3/2022 |

OTHER PUBLICATIONS

Choi et al., "Implementation Concept of Operation for a Multi-Purpose Cassegrain Solar Concentrator, Micro-Spectrometers, and Electrostatic Neutralizers to Enable In Situ Construction Activities plus Lunar, Planetary, and Deep Space Science Exploration on the Moon," NASA, Langley Research Center, Oct. 1, 2020.
International Search Report and Written Opinion mailed May 10, 2024 for International Patent Application No. PCT/US2023/084723.
Boles et al., "In Situ Resource Utilization: Excavation to Support Other Operations" ASCE library, Space 2002 and Robotics 2002, Apr. 26, 2012, abstract.
Gajda, "A Lunar Volatiles Miner", Fusion Technology Institute, Wisconsin, May 2006.
Gertsch et al., "Review of Lunar Regolith Properties for Design of Low Power Lunar Excavators Lunar Excavators " Missouri S&T, International Conference on Case Histories in Geotechnical Entineering, Aug. 14, 2008.
Gunter, "Investigation and Development of Regolith Excavation and Handling Mechanisms for Lunar In-Situ Resource Utilisation" University of Manchester, Thesis, 2021, pp. 1-24.
Just et al. "Development and test of a Lunar Excavation and Size Separation System (LES3) for the LUVMI-X rover platform" Journal of Field Robotics, p. 263-280, 2022.
Just et al., Experimental proof-of-concept of the effect of inlet geometry on excavation forces and their reduction for small-scale continuous excavators, Acta Geotechnica, Research Paper, 16 pages, Aug. 12, 2022.
Kleinhenz et al., "Lunar Resource Utilization: Development of a Reactor for Volatile Extraction from Regolith", Aerospace Sciences Meetings Home Session GPSE-5, Abstract, Jun. 19, 2012.
Kleinhenz et al., Volatiles Loss from Water Bearing Regolith Simulant at Lunar Environments, 16th Biennial International Conference on Engineering, Science, Construction, and Operations in Challenging Environments, Abstract, 2018.
Kulcinski et al., "Impact of lunar volatiles produced during He-3 mining activities" AIAAPapers onDisc, Jan. 1996, abstract.
Li et al., "Lunar Surface Mining for Automated Acquisition of Helium 3: Methods, Processes, and Equipment" Wisconsin Center for Space Automation and Robotics, Sep. 1988.
Li etal., "Lunar Surface Mining for Automated Acquisition of Helium-3 Methods, Processes, and Equipment" University of Wisconsin, Madison, 1992.
Mueller et al. "NASA Lunabotics Robotic Mining Competition 10th Anniversary (2010-2019): Taxonomy and Technology Review", ASCE Library, Abstract, 2021.
Mueller et al., "A Review of Lunar Regolith Excavation Robotic Device Prototypes", AIAA Space Forum, Abstract, Jun. 14, 2012.
Olson, "Helium Extraction Through Agitation from Lunar Regolith Simulant in a Heat Pipe Heat Exchanger" The University of Wisconsin—Madison ProQuest Dissertations Publishing, 2018, 24 pages total, including front matter and pp. 1-6.
Olson, "Helium Implantation into JSC-1A Lunar Simulant for Volatile Extraction System Testing" Proceedings of the Wisconsin Space Conference, Unitersity of Wisconsin, Madison, Abstract, 2016.
Olson, "Lunar Helium-3: Mining Concepts, Extraction Research, and Potential ISRU Synergies" , Aerospace Research Central, Abstact, Dec. 18, 2023.
Petrick et al. "High-Efficiency Extraction and Utilization of Lunar Solar Wind Volatiles", AIP Conference Proceedings, vol. 880, Issue 1, Abstract, Jan. 30, 2007.
Pettit, "Fractional Distillation in a Lunar Environment", Los Alamos National Library, Los Alamos, NM, 1985.
Rasera et al., "The beneficiation of lunar regolith for space resource utilisation: A review" Planetary and Space Science 186, 2020.
Sanders et al., "Progress Made in Lunar In Situ Resource Utilization under NASA's Exploration Technology and Development Program", Journal of Aerospace Engineerinc, vol. 26, No. 1, Abstract, Jan. 14, 2012.
Schmitt et al., "Spiral Mining for Lunar Volatiles", Fusion Technology Institute, NEEP602 Course Notes, 1992.
Schmitt, "Solar Wind Helium Concentrations in Undisturbed Lunar Regolith", Space Resources Rountable VI, 2004.
Schmitt, "Lunar Hydrogen And Helium Resource Development" Ascend, Abstract, Nov. 2, 2020.
Sviatoslavsky et al., "Mobile helium-3 mining and extraction system and its benefits toward lunar base self-sufficiency", IN Engineering, Abstract, 1988.
Tang et al. A Novel Sample Manipulation Device (SMD) for Lunar Regolith Volatile In-Situ Exploration: Method and Validation; IEEE, Abstract only (Dec. 2022).
Unknown, "Mining the Moon", Rare Minerals—Helium, Popular Mechanics, Dec. 6, 2004.
Wittenberg et al., "A Review of 3He Resources and Acquisition for Use as Fusion Fuel", Fusion Technology, vol. 21, Issue 4, Abstract, 1992.
Zacny et al., "Novel Approaches to Drilling and Excavation on the Moon", AIAA Space Forum, Session SR-1: Excavation and Site Selection, Abstract, Jun. 14, 2012.

* cited by examiner

LUNAR REGOLITH PROCESSING SYSTEM FOR MINING AND BENEFICIATION

CROSS-REFERENCE TO RELATED APPLICATIONS

This application claims the benefit of U.S. Provisional Application No. 63/476,361 filed on Dec. 20, 2022, the entire disclosure of which is incorporated herein by reference for all purposes.

BACKGROUND

1. Field

The following description relates to devices, systems, and methods for extracting volatile gases from lunar regolith.

2. Description of Related Art

Helium-3 (3He) is a light, stable isotope of helium useful in medical imaging, cryogenics, neutron detection, and in particular, the emerging field of aneutronic nuclear fusion for energy production. Helium-3 fusion reactions are aneutronic. That is, fusion of helium-3 can produce no harmful neutrons that can damage and render reactor components radioactive. Further, progress in development of applications of helium-3 is hindered by the rarity of helium-3 on Earth. On Earth, the naturally occurring ratio of helium-3 to the predominant helium isotope, helium-4 (4He), is on the order of 1 part per million. Nearly all of the very limited supplies of helium-3 used in industry, national security, and scientific research are produced through the decay of radioactive tritium that through beta decay becomes helium-3. Tritium is a radioactive isotope of hydrogen with a 12.3 year half-life, produced as a byproduct of the maintenance of nuclear weapons. A very limited amount of helium-3 is produced in the operation of CANDU power reactors. Further, with the reduction in nuclear weapons production, the corresponding stockpiles of tritium and therefore helium-3 are dwindling. The world production of helium-3 is currently less than 8 kg per year. (See, "The Helium-3 Shortage: Supply, Demand, and Options for Congress" (Report) by Dana A. Shea and Daniel Morgan, Congressional Research Service. 7-5700, 22 Dec. 2010.)

In contrast, helium-3 is much more abundant in certain non-terrestrial environments where solar wind directly impacts lunar and asteroidal surfaces. The helium-3 in the solar wind is produced in fusion reactions in the Sun and expelled in ionized form, along with ionized helium-4 (alpha particles) and ionized hydrogen (protons). In proportion to helium-4, the concentration of helium-3 in the solar wind is on the order of 100 parts per million, or 100 times more prevalent than in terrestrial sources. Due to the Earth's magnetosphere, the solar wind is deflected from entering the Earth's atmosphere; however, the Moon lacks a global magnetic field and therefore solar wind particles have collected over billions of years on its regolith, the outer layer of unconsolidated debris and fine grained particles that cover the Moon's surface. The existence of helium-3 in the lunar regolith has been confirmed from samples taken during the Apollo missions. The total reserves of helium-3 in the lunar regolith have been estimated at $6.5\times10^{8}$ kg, which is enough reserves to provide clean fusion power to meet the current world electricity supply for thousands of years. (See, "Quantitative estimation of helium-3 spatial distribution in the lunar regolith layer," by Wenzhe Fa et al., Icarus, Volume 190, Issue 1, 2007, Pages 15-23.)

The lunar regolith contains a variety of materials of economic value in addition to helium-3, such as helium-4, hydrogen, oxygen, water, silicon and metals. While these other materials have potential uses for future industry on the Moon, they are all abundant on the Earth. Therefore, there is likely no economic return from extracting them from the regolith for terrestrial use, although economical use in space is likely. Helium-3 is the one substance identified that has both recoverable reserves on the Moon in far greater quantities than on Earth and potentially could be sold at a market price that would justify the cost of its extraction and recovery. Methods have therefore been proposed for extraction and separation of helium-3 from the lunar regolith.

Existing methods for extraction and separation of helium-3 from the lunar regolith use heat to approximately 700-900 degrees Celsius to release volatile gases from the lunar regolith, such as with the concentration of sunlight, fission heat, or application of microwave radiation, followed by fractional condensation to separate out the different volatile components. These methods have the drawback of requiring the deployment and maintenance of a large infrastructure to the Moon to provide the power source for heating. Transport and maintenance of machinery to the lunar surface is a difficult and expensive undertaking. Additionally, heating produces a large quantity of volatiles of which helium-3 represents only a small fraction, less than 1 part in 18,000 by mass. (See, "A Lunar Volatiles Miner," by Matthew E. Gajda, Fusion Technology Institute, University of Wisconsin, May 2006, Page 3.)

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure herein is directed to devices, systems, and methods for extracting volatile gases from lunar regolith. Among the findings of analysis of lunar regolith samples returned from Apollo missions were a higher concentration of solar wind volatiles in the smaller regolith particle sizes and a higher concentration of volatiles sampled from unsieved particles (as much as 30% higher in unsieved samples). (See, "A Review of Helium-3 Resources and Acquisition for Use as Fusion Fuel," by L. J. Wittenberg, et. al., WCSAR-TR-AR3-9107-1, Fusion Technology, Special Issue on DHe3 Fusion, Vol. 21 (4), 2230-2253.) Thus, the process of sieving the soil liberates a substantial percentage of the solar wind particles, primarily hydrogen and helium. Accordingly, the disclosure herein is directed to devices, systems, and methods that extract volatile gases from lunar regolith based on agitation and sieving of the lunar regolith. More specifically, embodiments disclosed herein perform regolith beneficiation that focuses on helium-3 extraction, with hydrogen and helium-4 as by-products, and minimize energy input and the associated infrastructure requirements.

According to some embodiments, a lunar regolith processing system can be a mobile robotic processing platform that can be deployed on the lunar surface. The platform can be powered by a variety of power sources. The platform can include an excavator, a hopper, a mill, and a refinery. The platform can move along the lunar surface on treads or wheels and the excavator can be configured to scoop up regolith and deposit the regolith into the hopper as the platform moves. In some embodiments, the hopper can include a coarse slotted screen configured to reject the largest rock fragments. In some embodiments, the platform can be operated in a trench with the bucket-wheel excavator working against a forward wall of the trench as the bucket-wheel excavator is extended.

The regolith deposited in the hopper can be fed in a regolith stream into the mill, and the mill can be configured to agitate the regolith and use small dense rock fragments in the regolith to break up friable regolith breccia fragments and coarse, glassy agglutinates to release contained volatiles as part of the overall agitation of regolith fine grains (hereinafter, "fines"), thereby releasing loosely-held volatiles on particle surfaces of the regolith. The released volatiles can be drawn off from the mill and then fed to the refinery.

In some embodiments, the refinery can be configured to separate helium and hydrogen from other volatiles in the released volatiles through fractional condensation. In some embodiments, waste regolith can be removed from the mill once the volatiles have been extracted, and the waste regolith can be deposited back on the lunar surface with little significant change.

In some embodiments, the platform can continue to move across the lunar surface, scooping up regolith, releasing volatiles through agitation of the regolith, separating helium and hydrogen from other released volatiles, and depositing waste regolith stream back on the surface behind the platform, until the platform requires maintenance or replenishment of its power source.

In some embodiments, periodically, when storage containers for storing volatiles from the refinery on the platform have reached their capacity, the stored volatiles can be taken off the platform and distributed to markets.

In some embodiments, a lunar regolith processing system includes at least one mobile robotic processing platform and at least one fixed processing platform. In some embodiments, the mobile robotic processing platform can include an excavator, a hopper, and a mill, and the fixed processing platform can include a refinery.

In one general aspect, a lunar regolith processing system can include: an excavator configured to extract regolith from a lunar surface; a hopper configured to receive the extracted regolith from the excavator and convey a portion of the extracted regolith including rock fragments and finely crushed particles out of the hopper; a mill configured to receive the portion of the extracted regolith from the hopper, and agitate the portion of the extracted regolith, without the lunar regolith processing system applying heat to the portion of the extracted regolith, such that the agitation of the portion of the extracted regolith releases volatile gases including hydrogen, helium-3, and helium-4 from the portion of the extracted regolith; and a refinery configured to receive the volatile gases from the mill.

The lunar regolith processing system can be a mobile platform configured to operate the excavator to extract the regolith from the lunar surface as the mobile platform moves along the lunar surface.

The refinery can be further configured to separate the helium-3 from a remainder of the released volatile gases through either one or both of fractional condensation and membrane separation.

The lunar regolith processing system can further include a vacuum pump configured to pump the released volatile gases from the mill to the refinery.

The lunar regolith processing system can be configured to flow a diluent gas to the mill to increase gas pressure in the mill during the pumping of the released volatile gases from the mill to the refinery.

The refinery can be further configured to flow a diluent gas to the mill to increase gas pressure in the mill during the pumping of the released volatile gases from the mill to the refinery.

The refinery can include an evaporative heat exchanger and a condenser. The refinery can be configured to flow the released volatile gases to the condenser through the evaporative heat exchanger. The condenser can be configured to separate the helium-3 in gaseous form from the hydrogen and the helium-4 by condensing the hydrogen and the helium-4 to hydrogen liquid and helium-4 liquid. The refinery can be further configured to: flow the hydrogen liquid and the helium-4 liquid through the evaporative heat exchanger to cool additional released volatile gases that are released by an operation of the mill subsequent to the release of the volatile gases; and flow the cooled additional released volatile gases to the condenser.

The hydrogen liquid and the helium-4 liquid can be evaporated to form gaseous hydrogen and gaseous helium-4 upon cooling the additional released volatile gases in the evaporative heat exchanger. The lunar regolith processing system can be configured to vent at least a portion of the gaseous hydrogen and the gaseous helium-4 to space, or flow at least some of the gaseous hydrogen and the gaseous helium-4 to the mill to increase gas pressure in the mill.

The refinery can include an evaporative heat exchanger, a condenser, and stored volatile liquids. The refinery can be configured to: flow the released volatile gases and the stored volatile liquids through the evaporative heat exchanger such that the released volatile gases are cooled by the stored volatile liquids; and flow the cooled released volatile gases from the evaporative heat exchanger to the condenser. The condenser can be configured to separate the helium-3 in gaseous form from the hydrogen and the helium-4 by condensing the hydrogen and the helium-4 to liquid hydrogen and liquid helium-4.

The refinery can be further configured to replenish the stored volatile liquids with the liquid hydrogen and the liquid helium-4.

The stored volatile liquids can be evaporated to form gaseous hydrogen and gaseous helium-4 upon cooling the released volatile gases in the evaporative heat exchanger. The lunar regolith processing system can be configured to vent at least a portion of the gaseous hydrogen and the gaseous helium-4 to space, or flow at least some of the gaseous hydrogen and the gaseous helium-4 to the mill to increase gas pressure in the mill.

The mill can include a rotatable hollow drum having a horizontal rotational axis that is parallel to the lunar surface. The rotatable hollow drum can be configured to rotate to agitate the portion of the extracted regolith such that the rock fragments embedded in the portion of the extracted regolith impact and break up friable regolith breccia fragments and course, glassy agglutinates to release the volatiles from particle surfaces of the regolith.

The mill can include: a mesh screen having a mesh cylindrical sidewall; an inner chamber disposed inside the mesh cylindrical sidewall; and a rotating assembly having a vertical rotational axis that is perpendicular to the lunar surface. The rotating assembly can include a rotatable vertical shaft and blades fixed to and configured to rotate with the rotatable vertical shaft. The rotating assembly and the mesh screen can be configured such that rotation of the vertical shaft causes the blades to agitate fine particles in the portion of the extracted regolith to release the volatiles from surfaces of the fine particles, and causes the mesh screen to: sort particles in the portion of the extracted regolith having a size greater than a limit size from the fine particles in the portion of the extracted regolith; and allow particles in the portion of the extracted regolith having a size less than or equal to the limit size to pass through the mesh screen.

In another general aspect, a method of processing lunar regolith can include: extracting regolith from a lunar surface; conveying a portion of the extracted regolith including rock fragments and finely crushed particles to a mill; operating the mill to agitate the portion of the extracted regolith, without applying heat to the portion of the extracted regolith, such that the agitation of the portion of the extracted regolith releases volatile gases including hydrogen, helium-3, and helium-4 from the portion of the extracted regolith; and conveying the volatile gases from the mill to a refinery.

The method can further include operating the refinery to separate the helium-3 from a remainder of the volatile gases.

The method of can further include pumping the released volatile gases from the mill to the refinery using a vacuum pump.

The method can further include flowing a diluent gas to the mill to increase gas pressure in the mill during the pumping of the released volatile gases from the mill to the refinery.

The method can further include: flowing the released volatile gases to a condenser in the refinery through an evaporative heat exchanger in the refinery; separating, using the condenser, helium-3 in gaseous form from the hydrogen and the helium-4 by condensing the hydrogen and the helium-4 to hydrogen liquid and helium-4 liquid; flowing the hydrogen liquid and the helium-4 liquid through the evaporative heat exchanger to cool additional released volatile gases that are released by an operation of the mill subsequent to the release of the volatile gases; and flowing the cooled additional released volatile gases to the condenser.

The method can further include: flowing the released volatile gases and stored volatile liquids through an evaporative heat exchanger in the refinery such that the released volatile gases are cooled by the stored volatile liquids; flowing the cooled released volatile gases from the evaporative heat exchanger to the condenser; and separating, using the condenser, the helium-3 in gaseous form from the hydrogen and the helium-4 by condensing the hydrogen and the helium-4 to liquid hydrogen and liquid helium-4.

In another general aspect, a lunar regolith processing system includes: an excavator configured to extract regolith from a lunar surface; a mill configured to receive a portion of the extracted regolith from the excavator, and agitate the portion of the extracted regolith such that the agitation of the portion of the extracted regolith releases volatile gases including hydrogen, helium-3, and helium-4 from the portion of the extracted regolith; a refinery; and a vacuum pump configured to pump the released volatile gases from the mill to the refinery. The lunar regolith processing system can be configured to flow a diluent gas to the mill to increase gas pressure in the mill during the pumping of the released volatile gases from the mill to the refinery.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
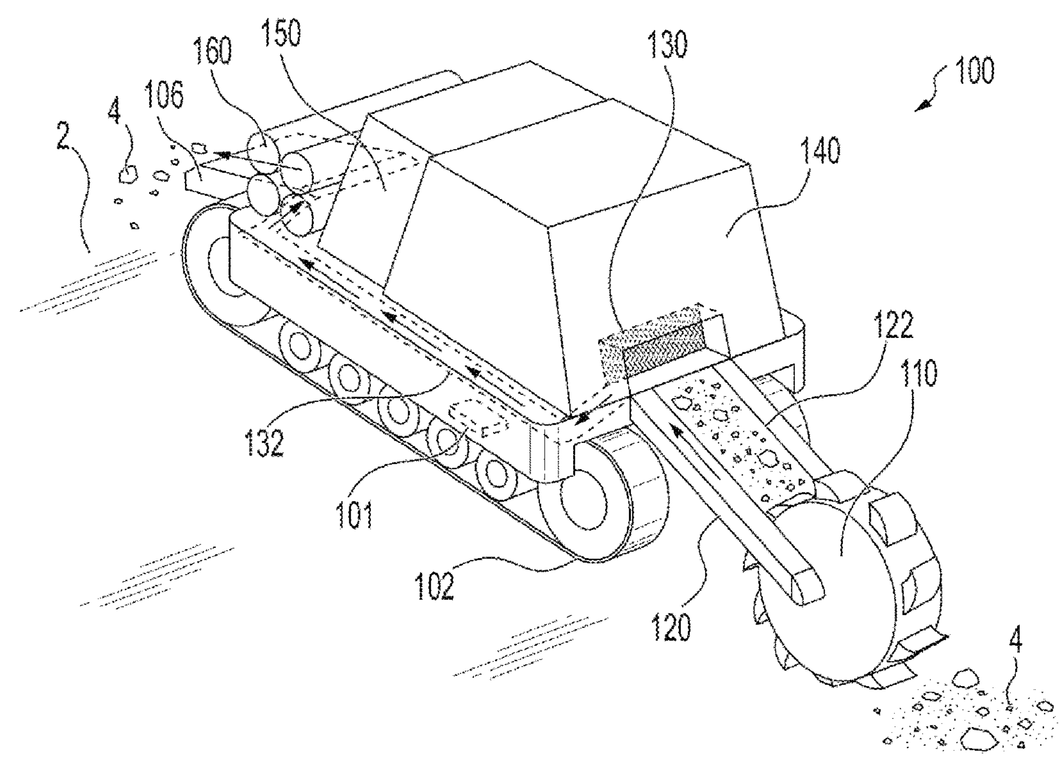
FIG. 1 is a side view of a mobile lunar regolith processing platform, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

In describing the invention, a number of components, processes, and techniques are disclosed. Each of these carries individual benefits and can be used in conjunction with others. This description does not list all possible useful combinations of these components, processes and techniques, but such combinations are entirely within the scope of the invention and the claims.

FIG. 1 illustrates a lunar regolith processing system 100, according to an embodiment. As illustrated in FIG. 1, the lunar regolith processing system 100 is a mobile lunar regolith processing platform that can be configured to move along the surface 2 of the Moon (hereinafter, "the lunar surface") by means of electrically driven rolling members 102, such as treads or wheels. The platform 100 can also be referred to as a mobile mining platform. The platform 100 includes an excavator 110, a hopper 120, a mill 140, and a refinery 150.

The excavator 110 can be disposed at a front end 104 of the platform 100. The excavator 110 is operable to scoop lunar regolith 4 from the lunar surface 2 as the platform moves along the lunar surface 2, and then deposit the scooped regolith 4 into the hopper 120. In some embodiments, the excavator 110 can be a bucket wheel excavator that rotates to scoop the regolith 4 and deposit the regolith 4 into the hopper 120.

The hopper 120 can include a first conveyor belt 122 that receives deposited regolith 4 and transports at least a portion of the deposited regolith 4 into the mill 140. In some embodiments, the hopper 120 can transport substantially all of the deposited regolith 4 into the mill 140. However, in some embodiments, the hopper 120 can transport the deposited regolith 4 to a screen 130 that allows only small fragments and fine grains of the regolith 4 (hereinafter, "filtered regolith") having a size less than a specified threshold size to pass therethrough and then into the mill 140. As a non-limiting example, in some embodiments, the threshold size can be approximately 10 mm in diameter. The screen 130 can separate out large fragments of the regolith 4 having a size greater than or equal to the threshold size and deposit the separated large fragments of the regolith 4 on a second conveyor belt 132. The second conveyor belt 132 can transport the separated large fragments of the regolith 4 to a rear end 106 of the platform 100, where they are expelled back onto the lunar surface 2. The flow of filtered regolith 4, composed of small regolith fragments and regolith fines, to the mill 140 can be designed to prevent any backflow of released volatiles.

The mill 140 can be configured to mechanically agitate the filtered regolith to extract volatiles without applying heat to the filtered regolith. The mill 140 can release the volatiles by agitation, without heat being applied to the extracted regolith 4 deposited therein. Thus, the platform 100 can extract volatiles from the extracted regolith 4 by agitation alone, without adding heat from a heat source. The volatiles can primarily include a mixture of hydrogen, helium-4, and helium-3 that were loosely implanted on the regolith 4 by solar wind activity. The extracted volatiles, which are in gaseous form, can then be transported to the refinery 150. For example, the extracted volatiles can be pumped to the refinery 150 through a volatile supply pipe.

The refinery 150 can separate the volatiles into their constituent molecules and atoms. For example, the refinery 150 can include a condenser configured to separate the volatiles by cooling the volatiles to temperatures below their respective condensation temperatures. For example, the condenser can separate the hydrogen, helium-4, and helium-3 gases from a remainder of the volatiles by fractional condensation. In another embodiment, refinery 150 can include one or more membranes configured to separate the hydrogen, helium-4, and helium-3 from a remainder of the volatiles by membrane separation. Once separated by the refinery 150, the hydrogen, helium-4, and helium-3 can be stored in cylinders 160 on the platform 150 as liquids.

Although the refinery 150 is illustrated and described as being included on the platform 100, in alternate embodiments, the platform may not include the refinery 150, and a refinery (e.g., a central hydrogen-helium separator) can be provided on a separate, fixed platform. In such embodiments, after exiting the mill 140, the released volatiles including hydrogen, helium-4, and helium-3 can be stored as gases at high-pressure in the cylinders 160 to be delivered to the refinery later, or the released volatiles can be transported to the refinery by flexible pipe. Waste volatiles, including largely carbon and nitrogen, can either be released or stored for potential future processing.

In some embodiments, waste regolith fines can be removed from the mill 140 and dropped onto the second conveyor belt 132, and thus can be deposited behind the platform 100. In some embodiments, waste regolith fines can be deposited separately outside the platform 100 for potential later recovery as feedstock for additive manufacturing. For example, in some embodiments, as the platform 100 moves across the lunar surface 2, it can eventually deposit substantially all the regolith and rock fragments it collects back onto the lunar surface 2, retaining only the volatiles extracted through agitation in the mill 140.

When the high-pressure cylinders 160 are filled to capacity with hydrogen, helium-4, and helium-3, the high-pressure cylinders 160 can be removed by a human crew or another robotic vehicle and replaced with empty high-pressure cylinders. Alternatively, in some embodiments, the hydrogen, helium-4, and helium-3 can be transferred from the high-pressure cylinders 160 to another storage vessel rather than removing the high-pressure cylinders 160.

In some embodiments, the platform 100 can be electrically powered by a variety of power sources. According to some embodiments, the platform 100 can carry an array of steerable solar photovoltaic panels and a battery module including one or more batteries. The steerable solar photovoltaic panels can allow the platform 100 to track the Sun as the platform 100 moves and operates during the lunar day. During the lunar night, the battery modules would allow the platform 100 to maintain system health while not excavating regolith until the Sun rises again to provide adequate power for regolith excavation.

In some embodiments, the power output collected by the solar photovoltaic panels can be enhanced by a fixed set of steerable mirrors at another location that concentrate a greater flux of solar radiation onto the solar photovoltaic panels.

In some embodiments, the electrical power for the platform 100 can be provided or supplemented by a hydrogen-oxygen fuel cell that generates electrical power and water. The hydrogen and oxygen for such a fuel cell can ultimately be produced by heating raw regolith in a separate mining operation. This water can then be separated back into hydrogen and oxygen using electrolysis. The electrical power for electrolysis can be generated by photovoltaic panels either on the platform 100 or at a different location nearby. The fuel cell can allow the platform to operate during lunar nights.

Further, in some embodiments, the electrical power for the platform 100 can be received through transmission of microwave radiation from a fixed power generating station at a nearby location on the Moon. In such embodiments, the platform 100 can have a steerable antenna or antenna array configured to collect the transmitted radiation. The collected microwave radiation can induce an alternating current in an antenna circuit, and the alternating current can be converted into power for use by the platform 100. This can enable the placement of a large, fixed power station at a location other than a location on the platform 100, thus making the platform 100 lighter than it would be if it needed to carry its own power-generating source. The fixed power station can generate power through a variety of means, including a large array of photovoltaic panels, a solar thermal power plant, a fission reactor, or a fusion reactor.

Several of the above-described power source embodiments can allow mining operations during lunar nights.

Further still, in some embodiments, the platform 100 can be powered by a radioactive isotope thermoelectric generator, where the decay of radioactive material generates heat that is then converted to electricity through use of thermocouples. This method also has the advantage of enabling platform mining operations by the platform 100 during lunar nights.

Operations of the platform 100, such as the processes performed by the excavator 110, the mill 140, and the refinery 150, can be controlled by one or more controllers 101 operatively connected to the excavator 110, the mill 140, and/or the refinery 150. The one or more controllers 101 can include one or more processors or computers configured to respond to and execute instructions in a defined manner to achieve a desired result. The one or more processors or computers can include, or be connected to, one or more memories storing instructions or software that are executed by the one or more processors or computers. In some embodiments, the control functions of the one or more controllers 101 can be controlled remotely through long-range communication systems allowing for teleoperation of the platform 100 from Earth, and/or through short range communication systems.

Figure 2:
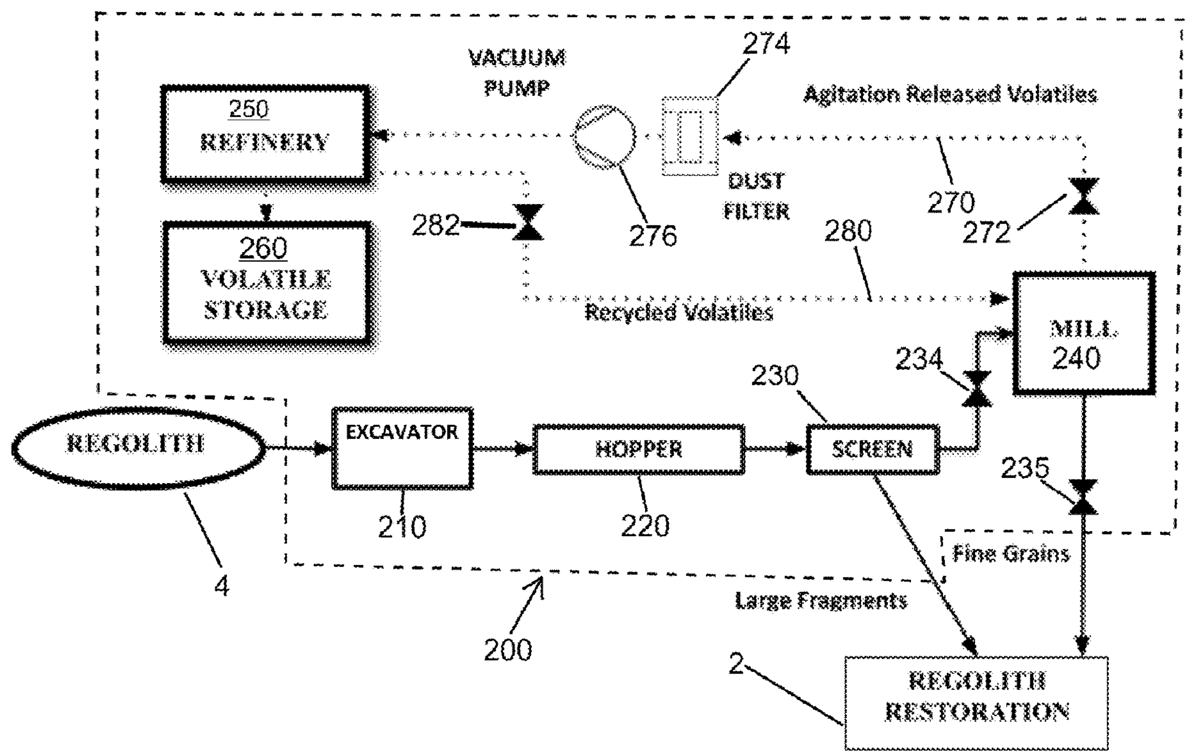
FIG. 2 is a schematic diagram of a lunar regolith processing system, according to an embodiment.

FIG. 2 is a flow diagram of a lunar regolith processing operations performed by a lunar regolith processing system or platform 200, according to an embodiment. The platform 200 can correspond to an embodiment of the system 100 of FIG. 1, for example. The platform 200 can include an excavator 210, a hopper 220, a screen 230, a mill 240, and a refinery 250, which can respectively correspond to the excavator 110, the hopper 120, the screen 130, the mill 140, and the refinery 150 in the embodiment of FIG. 1. The mill 240 is connected to the refinery 250 by a volatile supply line 270 and a volatile recycling line 280.

In the operations of FIG. 2, lunar regolith 4 is extracted/excavated by the excavator 210 (e.g., a bucket wheel excavator). The excavator 210 deposits the extracted regolith 4 into the hopper 220. The hopper 220 directs a flow of the extracted regolith 4 to the screen 230 (e.g., a slotted screen), which filters out large regolith fragments from the flow of the extracted regolith 4. The filtered large regolith fragments can be deposited back on the lunar surface 2 behind the platform 200. The remaining portion of the extracted regolith 4, which includes regolith fines and small regolith rock fragments sieved through the screen 130, passes through an inlet gate valve 234 to enter the mill 240. The mill 240 can be, for example, a rotating mill. The flow rate of the regolith fines and small regolith rock fragments 4 through the inlet gate valve 234 can be regulated so as to prevent back-flow of volatiles released by agitation due to the flow of the regolith fines and small regolith rock fragments 4 into the mill 240.

Once the mill 240 has reached a predetermined fill fraction of regolith material, the mill 240 can be sealed through closure of the inlet gate valve 234, a waste outlet gate valve 235, a volatile outlet valve 272 in the volatile supply line 270, and a recycled volatile inlet valve 282 in the volatile recycling line 280. Excavation of regolith 4 with the excavator 8 can be halted and the platform 200 can stop moving on the lunar surface 2. The mill 240 then agitates the regolith fines and small regolith rock fragments 4 deposited therein to release, in gaseous form, volatiles that are loosely on the surfaces of the regolith fines and small regolith rock fragments 4. For example, the mill 240 can have a rotating member that rotates to agitate the regolith fines and small regolith rock fragments 4 and thereby release the volatiles from the surfaces of the regolith fines and small regolith rock fragments 4. The mill 240 can release the volatiles by agitation, without heat being applied to the extracted regolith 4 deposited therein. Thus, the platform 200 can extract volatiles from the extracted regolith 4 by agitation alone, without adding heat from a heat source.

After agitating the small regolith rock fragments 4 for a sufficient amount of time to release volatiles into the free volume of the mill 240, agitation/rotation of the mill 240 is halted and regolith dust resulting from the agitation is allowed to settle in the mill 240. The volatile outlet valve 272 and the recycled volatile inlet valve 282 are then opened, and a pump 276 in the volatile supply line 270 is activated to pump the released volatiles into the refinery 250 through the volatile supply line 270. The pump 276 can be a vacuum pump, for example. A dust filter 274 can be disposed in the volatile supply line 270 to filter out any regolith dust in the flow of volatiles, and thereby prevent regolith dust from being carried to the refinery 250.

The refinery 250 can include an inert diluent gas storage storing inert diluent gas, such as helium-4, and can provide a flow of the stored inert diluent gas to the mill 250 through the volatile recycling line 280 and the recycled volatile inlet valve 282 while the released volatiles are being pumped to the refinery 250. The inert diluent gas can be pumped back to the refinery 250 through the volatile supply line 270 and the volatile outlet valve 272, along with the volatiles being pumped to the refinery 250. The purpose of the flow of diluent gas from the refinery 250 to the mill 240 and from the mill 240 back to the refinery 250 is to raise the pressure inside the circuit formed by the mill 240, the volatile supply line 270, the refinery 250, and the volatile recycling line 280 to allow the pump 276 to operate efficiently.

The refinery 250 separates the released volatile gases pumped from the mill 240. In some embodiments, the volatile gases are separated through fractional condensation. In some embodiments, the volatile gases can separated through membrane separation. Further, in some embodiments, fractional condensation and membrane separation can be used. For example, hydrogen can be separated by fractional condensation, and then remaining helium-4 and helium-3 can be separated by membrane separation.

In some embodiments in which fractional condensation is used, the refinery 250 includes a condenser that is operated to sequentially separate the volatiles in order from highest boiling point to lowest boiling point. Among hydrogen, helium-4, and helium-3, which are present in the released volatiles, hydrogen has the highest boiling point, helium-4 has the next highest boiling point, and helium-3 as the lowest boiling point. Thus, the condenser extracts hydrogen, helium-4, and helium-3 volatiles by first separating liquid hydrogen at a first condensation temperature set point, and then separating liquid helium-4 at a second condensation temperature set point. The remaining gas after the helium-4 condensation phase is therefore predominantly helium-3. The separated volatiles are stored in a volatile storage containers 260. The volatile storage containers 260 can include cryogenic dewars for storing hydrogen liquid and helium-4 liquid, and gas storage containers for storing helium-3. Once extraction of the volatiles is complete, the inlet gate valve 234 and the recycled volatile inlet valve 282 are closed/sealed. The waste outlet gate valve 235 can then be opened to release waste regolith fines to the lunar surface 2, and then subsequently closed/sealed. Then, the regolith excavation and milling cycle can be repeated, beginning with excavation by the excavator 210.

In alternative embodiments, the platform 200 can operated continuously, rather than stopping and starting, by using multiple mills running in parallel and diverting the excavated regolith into the next parallel mill as one mill is sealed for agitation.

Figure 3:
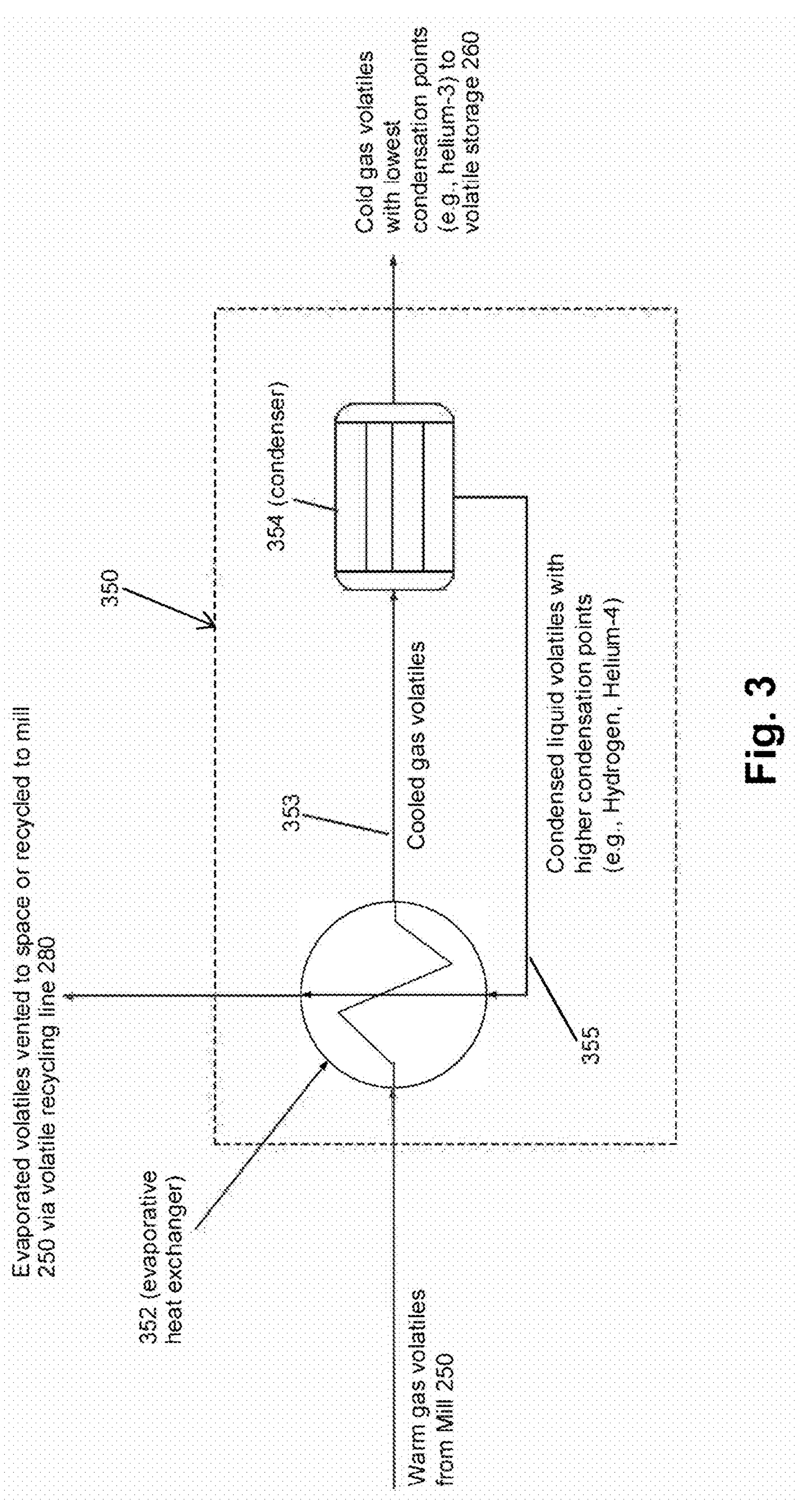
FIG. 3 illustrates a refinery for separating volatiles released from lunar regolith, according to an embodiment.

In some embodiments, such as the embodiment illustrated in FIG. 3, rather than storing all liquid fractional condensates (e.g., liquid hydrogen liquid and liquid helium-4) in cryogenic storage containers (e.g., dewars), some or all of the liquid fractional condensates can be collected sent through an evaporative heat exchanger to cool incoming gas volatiles entering the refinery. For example, if the objective is to isolate only the volatile with the lowest condensation point, which is helium-3 in the disclosed embodiments, then liquid hydrogen and helium-4 can be sent through the evaporative heat exchanger to reduce the power required to isolate helium-3.

Referring to FIG. 3, according to some embodiments, a refinery 350 can include an evaporative heat exchanger 352 and a condenser 354. The evaporative heat exchanger 352 and the condenser 354 can be connected to each other by cooled gas line 353 and a condensed liquid line 355. In some embodiments, warm gas volatiles (including hydrogen, helium-4, and helium-3) that are released by agitation of the extracted regolith 4 in the mill 250 of FIG. 2, are initially pumped (e.g., by the pump 276 in FIG. 2) to the evaporative heat exchanger 352 and then flow to the condenser 354, which performs fractional condensation to produce condensed liquid volatiles (e.g., hydrogen and helium-4), and gaseous volatile(s) (e.g., helium-3). The gaseous helium-3 is delivered to the volatile storage 260 of FIG. 2. Once a sufficient volume of condensed liquid volatiles is collected, the condensed liquid volatiles flow through the evaporative heat exchanger 352 from the condensed liquid line 355 while additional warm gas volatiles (including hydrogen, helium-4, and helium-3) released by subsequent agitation of regolith by the mill 250 are pumped through the evaporative heat exchanger 352. Thus, the condensed liquid volatiles flowing through the evaporative heat exchanger 352 will absorb heat from the additional warm gas volatiles as they cool the additional warm gas volatiles, thereby converting the additional warm gas volatiles to cooled gas volatiles. The cooled gas volatiles can then flow to the condenser 354, which performs fractional condensation to produce additional gaseous helium-3 and additional condensed liquid volatiles. Thus, the implementation of the evaporative heat exchanger 352 with the condenser 354 reduces the power required to cool and isolate the additional warm gas volatiles.

Upon absorbing heat from the additional warm gas volatiles in the evaporative heat exchanger 352, the condensed liquid volatiles evaporate and are thus converted to gaseous volatiles (e.g., hydrogen and helium-4). In some embodiments, at least a portion of the gaseous volatiles produced from the conversion of the condensed liquid volatiles absorbing the heat from the warm gas volatiles can be vented to space. Alternatively, in some embodiments, at least a portion of the gaseous volatiles produced from the conversion of the condensed liquid volatiles can be recycled for other purposes. For example, at least a portion of the gaseous volatiles produced from the conversion of the condensed liquid volatiles can be used as the diluent gas and diverted back to the mill 250 through the volatile recycling line 280, as described with respect to FIG. 2.

Referring to FIG. 3, in some embodiments, a condensed liquid volatile storage can be provided in the condensed liquid line 355 and can be pre-filled with stored condensed liquid volatiles. In such embodiments, the stored condensed liquid volatiles can be flowed through the evaporative heat exchanger 352 to cool an initial flow of warm gas volatiles released by the mill 250, such that there is no delay in implementing the evaporative heat exchanger 352 to cool warm gas volatiles released by the mill 250. Upon absorbing heat from the warm gas volatiles in the evaporative heat exchanger 352, the stored condensed liquid volatiles evaporate and are thus converted to gaseous volatiles (e.g., hydrogen and helium-4). Further, in such embodiments, condensed liquid volatiles produced by the condenser performing fractional condensation on the cooled gas volatiles exiting the evaporative heat exchanger 352 can be used to replenish the stored condensed liquid volatiles in the condensed liquid line 355.

Figure 4:
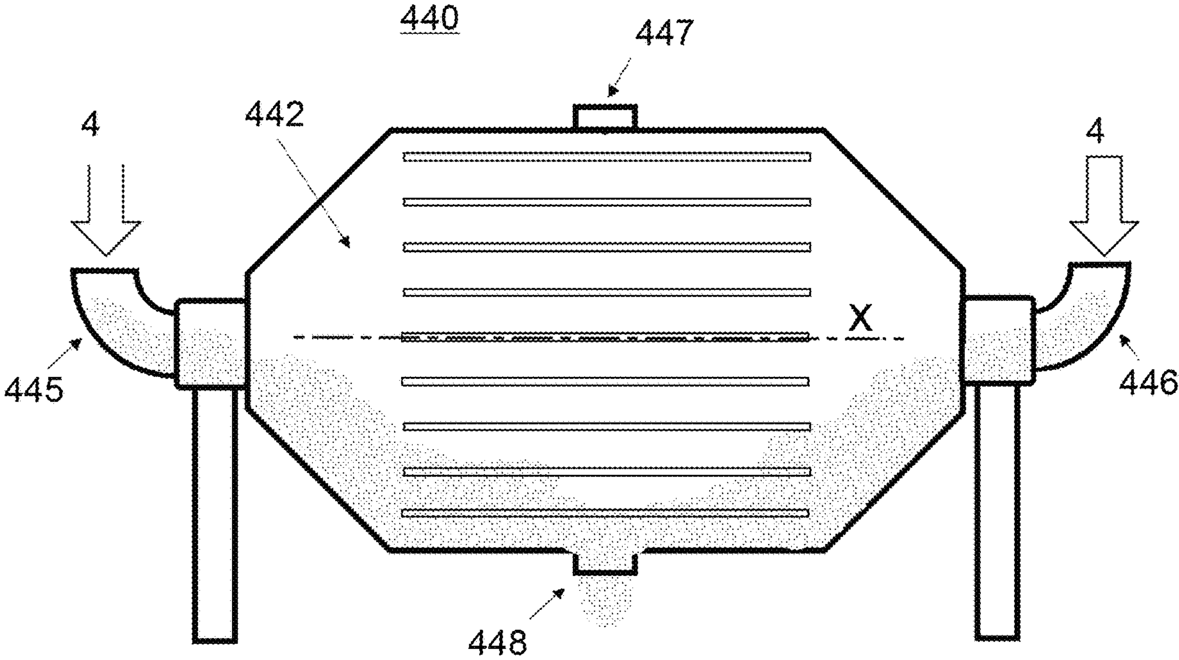
FIG. 4 illustrates a mill for extracting volatiles from lunar regolith, according to an embodiment.

FIG. 4 illustrates a mill 440, according to an embodiment. The mill 440 can correspond to the mills 140 and 240 in the embodiments of FIGS. 1 and 2, respectively.

Referring to FIG. 4, the mill 440 includes a hollow drum 442. The hollow drum 442 has a horizontal rotational axis X that is substantially parallel to the ground (e.g., the lunar surface 2 in FIG. 1). A portion of the excavated regolith 4 including a mixture of regolith fines and small, coarse regolith rock fragments, such as those that have passed through the screen 130/230, is fed into the hollow drum 442 through either one or both of a first chute 445 and a second chute 446 disposed at opposite horizontal ends of the mill 440. When the hollow drum 442 is adequately filled with regolith material, gate valves seal the first and/or second chutes 445/446, a volatile outlet port 447, and a waste discharge port 448, and thereby seal the hollow drum 442. Once sealed, the hollow drum 442 rotates about the horizontal rotational axis X by means of a belt drive to agitate the regolith mixture. The mixture of different regolith particle sizes in the hollow drum 442 promotes release of volatiles in the agitation process through particle impact and friction. More specifically, rotation of the hollow drum 442 agitates the regolith material and uses small dense rock fragments in the regolith material to break up friable regolith breccia fragments and coarse, glassy agglutinates to release contained volatiles as part of the overall agitation of regolith fines, thereby releasing loosely-held volatiles on particle surfaces of the regolith material. When rotation of the hollow drum 442 is halted, the gate valve sealing the volatile outlet port 447 is opened and the volatiles are drawn off through the volatile outlet port 447 at the top of the mill 440, as described with respect to the mill 240 in the embodiment of FIG. 2. After the volatile extraction process is complete, the hollow drum 442 is rotated again, the gate valve sealing the waste discharge port 448 is opened, and waste regolith material exits through the waste discharge port 448 at the bottom center of the mill 442. The waste regolith can be carried to a conveyor belt (e.g., the second conveyor belt 132 of FIG. 1) below the mill 440 to a location behind the platform (e.g., the platform 100 or 200) where it later can be processed for other uses, such as feedstock for additive manufacturing. In some embodiments, the waste discharge port 448 can be positioned at other locations in the hollow drum 442, such as on the bottom but offset to one horizontal end of the hollow drum 442, and the interior surface of the hollow drum 442 can be contoured to allow gravity to migrate the waste regolith material toward the waste discharge port 448 as the hollow drum 442 is rotated.

Figure 5:
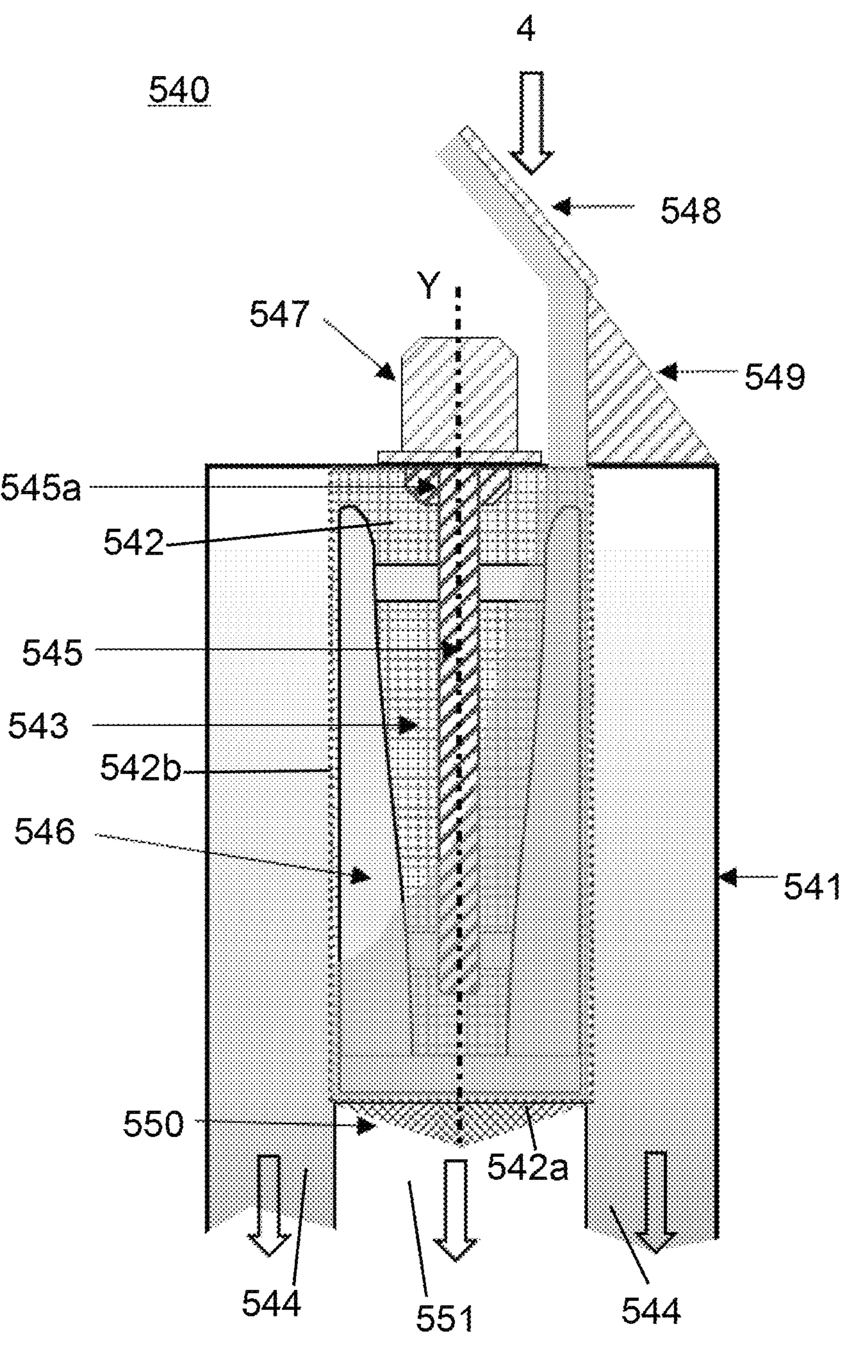
FIG. 5 illustrates a mill for extracting volatiles from lunar regolith, according to an embodiment.

FIG. 5 illustrates a mill 540, according to an embodiment. The mill 540 can correspond to the mills 140 and 240 in the embodiments of FIGS. 1 and 2, respectively.

Referring to FIG. 5, the mill 540 includes a hollow cylindrical outer housing 541 having a vertical axis Y that is substantially perpendicular to the ground (e.g., the lunar surface 2 of FIG. 1), and a mesh screen 542 having a bottom wall 542*a* and a cylindrical sidewall 542*b* that is coaxial with the hollow cylindrical outer housing 541. An inner chamber 543 is formed inside the mesh screen, and an annular chute 544 is formed between the cylindrical sidewall 542*b* and sidewalls of the outer housing 541.

The mill 540 includes a rotatable assembly disposed in the inner chamber 545. The rotatable assembly can include a rotatable vertical shaft 545 and paddle blades 546 fixed to the rotatable vertical shaft 545. In the illustrated embodiment, the vertical axis Y is the rotational axis of the shaft 545. The shaft 545 and the paddle blades 546 are configured to rotate together about the vertical axis Y. However, in some embodiments, the rotational axis of the shaft 545 can be parallel to and offset from the vertical axis Y. The mill 540 can further include an electric motor 547 that drives the shaft 545 through a bearing 545*a*.

The mill 540 can include a slotted screen 548 disposed at a top end thereof. The slotted screen 548 can be configured to reject large fragments of regolith that have a size greater than a selected upper limit size, while allowing fines and small fragments of regolith that have a size less than or equal to the upper limit size to pass therethrough.

In some embodiments, regolith 4 that is excavated by the excavator 110/210 is dropped onto the slotted screen 548. The slotted screen 548 blocks the large fragments of regolith and causes the large fragments of regolith to fall onto a ramp 549, which carries the large fragments of regolith back to the lunar surface 2. Regolith fines and small regolith fragments pass through the slotted screen 548 and drop into the inner chamber 543. Thus, the slotted screen 548 and the ramp 549 form a size sorting mechanism to reject large regolith fragments.

The electric motor 547 rotates the shaft 545 and thus rotates the paddle blades 546 inside the inner chamber 543, thereby stirring and agitating the regolith fines and small regolith fragments so as to release volatiles from the regolith fines and small regolith fragments. The paddle blades 546 are angled to push the regolith fines and small regolith fragments into the cylindrical sidewall 542*b* of the mesh screen 542, thereby forcing the regolith fines to filter through the mesh screen 542 into the annular chute 544 surrounding the mesh screen 542, while retaining the small regolith fragments inside the inner chamber 543.

In some embodiments, the tips of the paddle blades 546 can have anti-binding features such as brushes to prevent particles from clogging the mesh screen 542. The regolith fines filtered through the mesh screen 542 have a number of potential uses for future lunar development, including use as a material for manufacturing or to take into mining beneficiation processes for further extraction of material. The fines that are filtered into the annular chute 544 can be carried by the annular chute 544 to a storage hopper on the platform 100/200 for later retrieval. The regolith fragments retained in the inner chamber 543 can eventually be deposited back to the lunar surface 2 by an articulating flap 550 at the bottom of the inner chamber 543. The articulating flap 550 can be opened after the agitation process is complete, and the volatiles can be pumped out of the mill 540 into the refinery 150/250/350 as previously described with respect to FIG. 2. The regolith fragments retained in the inner chamber 543 can be discharged from the mill 540 through a separate chute 551 disposed below the inner chamber 543.

Although the description above describes as a single mobile mining platform 100/200, in some embodiments, multiple mining platforms can work in coordination to increase mining production. In these embodiments, different platforms can each be assigned to harvest a different geographical section of regolith. The multiple platforms can either be the same in configuration or can differ in configuration. In some embodiments, the multiple platforms can be of the same configuration to allow for optimization of a single modular design and scaling of production rate by increasing the number of such platforms deployed to the lunar surface 2. In some embodiments, different platform configurations that are optimized for movement and excavation in different types of terrain can be provided.

In some embodiments, a lunar regolith processing system can include a mixture of fixed and mobile platforms for processing lunar regolith. An example of such a system is illustrated in FIG. 6, which is described below.

Figure 6:
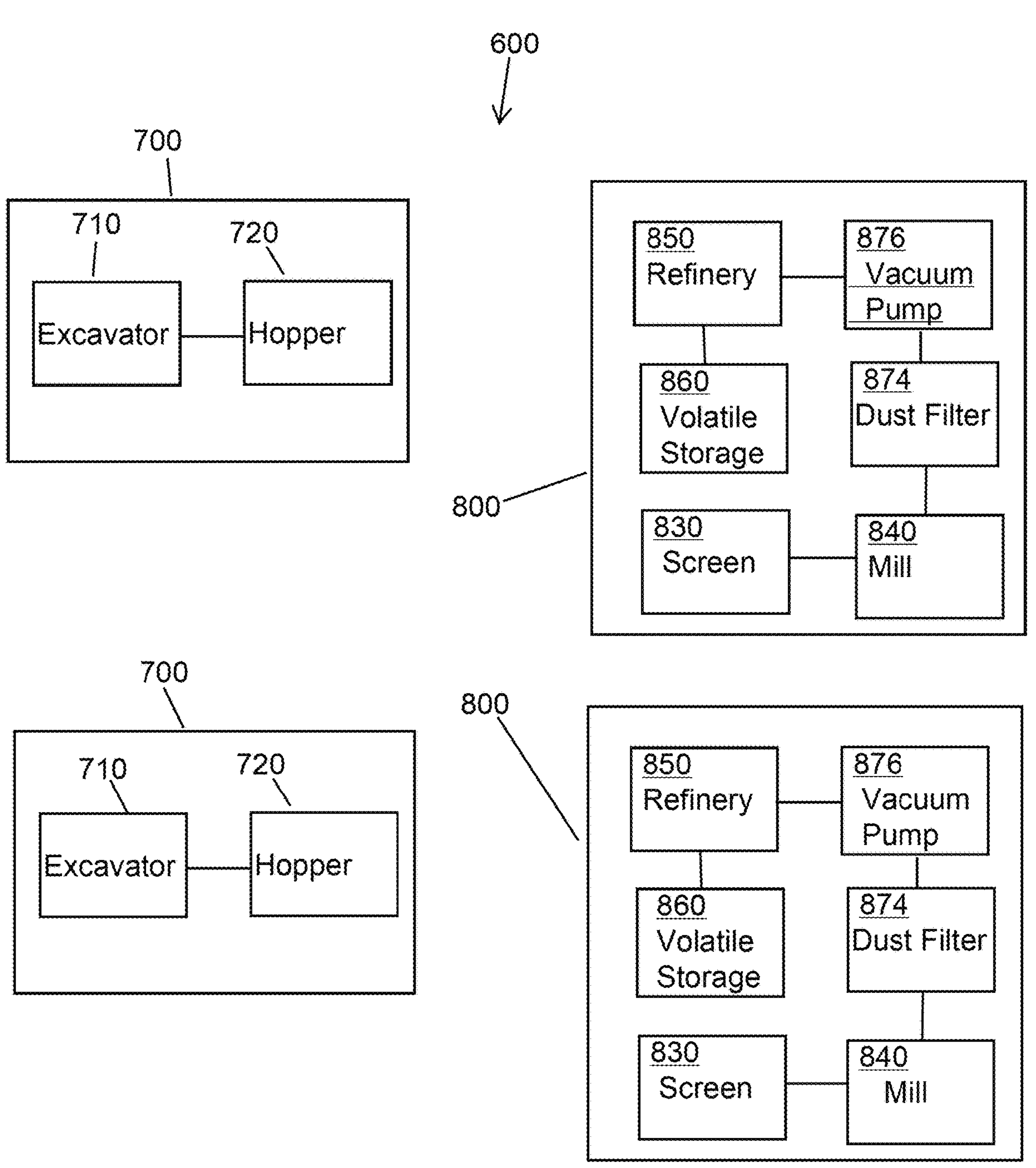
FIG. 6 is a schematic diagram of a lunar regolith processing system, according to an embodiment.

Referring to FIG. 6, a lunar regolith processing system 600 can include one or more mobile lunar regolith processing platforms (mobile mining platforms) 700 and one or more fixed lunar regolith processing platforms (fixed mining platforms) 800. Each of the mobile mining platforms 700 can be configured to move across the lunar surface 2 in the same manner described above with respect to the platforms 100 and 200 in FIGS. 1 and 2, respectively. Each of the mobile mining platforms 700 can include an excavator 710 and a hopper 720, which can respectively correspond to the excavators 110, 210 and the hoppers 120, 220 in the embodiments described above. Each of the fixed mining platforms 800 can include a screen 830, a mill 840, a dust filter 874, a vacuum pump 876, a refinery 850, and a volatile storage 860, which can respectively correspond to the screens 130, 230, the mills 140, 240, 440, 540, the dust filter 274, the vacuum pump 276, the refineries 150, 250, 350, and the volatile storages 160, 260 in the embodiments described above.

Thus, the one or more mobile mining platforms 700 can excavate and collect regolith 4, and then selectively dock and connect with the one or more fixed mining platforms 800 to offload their collected regolith 4. The one or more fixed mining platforms 800 can then agitate fines and small fragments of the collected regolith 4 to release volatiles from the fines and small fragments of the collected regolith 4, and thereafter refine, separate, and store the volatiles recovered from the one or more mobile mining platforms 700 as described above in the embodiments of FIGS. 1-5. Thus, the system 600 minimizes the amount of equipment the mobile mining platforms 700 must carry, thereby extending the battery life and traveling range of the mobile mining platforms 700.

The one or more mobile mining platforms 700 can periodically dock with the fixed mining platforms 800 to offload their collected regolith 4. In some embodiments, the one or more fixed mining platforms 800 can also contain long-range communication systems allowing for teleoperation of the system 600 from Earth. In some embodiments, the one or more fixed mining platforms 800 can route communications between remote operators on Earth to the one or more mobile mining platforms 700 using short-range communications systems.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lunar regolith processing system, comprising:
- an excavator configured to extract regolith from a lunar surface;
- a hopper configured to receive the extracted regolith from the excavator and convey a portion of the extracted regolith including rock fragments and finely crushed particles out of the hopper;
- a mill configured to receive the portion of the extracted regolith from the hopper, and agitate the portion of the extracted regolith, without the lunar regolith processing system applying heat to the portion of the extracted regolith, such that the agitation of the portion of the extracted regolith releases volatile gases including hydrogen, helium-3, and helium-4 from the portion of the extracted regolith; and
- a refinery configured to receive the volatile gases from the mill.

2. The lunar regolith processing system of claim 1, wherein the lunar regolith processing system is a mobile platform configured to operate the excavator to extract the regolith from the lunar surface as the mobile platform moves along the lunar surface.

3. The lunar regolith processing system of claim 1, wherein the refinery is further configured to separate the helium-3 from a remainder of the released volatile gases through either one or both of fractional condensation and membrane separation.

4. The lunar regolith processing system of claim 3, further comprising:
- a vacuum pump configured to pump the released volatile gases from the mill to the refinery.

5. The lunar regolith processing system of claim 4, wherein the lunar regolith processing system is configured to flow a diluent gas to the mill to increase gas pressure in the mill during the pumping of the released volatile gases from the mill to the refinery.

6. The lunar regolith processing system of claim 4, wherein the refinery is further configured to flow a diluent gas to the mill to increase gas pressure in the mill during the pumping of the released volatile gases from the mill to the refinery.

7. The lunar regolith processing system of claim 1, wherein the refinery comprises an evaporative heat exchanger and a condenser,
- wherein the refinery is configured to flow the released volatile gases to the condenser through the evaporative heat exchanger,
- wherein the condenser is configured to separate the helium-3 in gaseous form from the hydrogen and the helium-4 by condensing the hydrogen and the helium-4 to hydrogen liquid and helium-4 liquid, and
- wherein the refinery is further configured to:
  - flow the hydrogen liquid and the helium-4 liquid through the evaporative heat exchanger to cool additional released volatile gases that are released by an operation of the mill subsequent to the release of the volatile gases; and
  - flow the cooled additional released volatile gases to the condenser.

8. The lunar regolith processing system of claim 7, wherein the hydrogen liquid and the helium-4 liquid are evaporated to form gaseous hydrogen and gaseous helium-4 upon cooling the additional released volatile gases in the evaporative heat exchanger, and
- wherein the lunar regolith processing system is configured to vent at least a portion of the gaseous hydrogen and the gaseous helium-4 to space, or flow at least some of the gaseous hydrogen and the gaseous helium-4 to the mill to increase gas pressure in the mill.

9. The lunar regolith processing system of claim 1, wherein the refinery comprises an evaporative heat exchanger, a condenser, and stored volatile liquids,
- wherein the refinery is configured to:
  - flow the released volatile gases and the stored volatile liquids through the evaporative heat exchanger such that the released volatile gases are cooled by the stored volatile liquids; and
  - flow the cooled released volatile gases from the evaporative heat exchanger to the condenser, and
- wherein the condenser is configured to separate the helium-3 in gaseous form from the hydrogen and the helium-4 by condensing the hydrogen and the helium-4 to liquid hydrogen and liquid helium-4.

10. The lunar regolith processing system of claim 9, wherein the refinery is further configured to replenish the stored volatile liquids with the liquid hydrogen and the liquid helium-4.

11. The lunar regolith processing system of claim 9, wherein the stored volatile liquids are evaporated to form gaseous hydrogen and gaseous helium-4 upon cooling the released volatile gases in the evaporative heat exchanger, and wherein the lunar regolith processing system is configured to vent at least a portion of the gaseous hydrogen and the gaseous helium-4 to space, or flow at least some of the gaseous hydrogen and the gaseous helium-4 to the mill to increase gas pressure in the mill.

12. The lunar regolith processing system of claim 1, wherein the mill comprises a rotatable hollow drum having a horizontal rotational axis that is parallel to the lunar surface, and wherein the rotatable hollow drum is configured to rotate to agitate the portion of the extracted regolith such that the rock fragments embedded in the portion of the extracted regolith impact and break up friable regolith breccia fragments and course, glassy agglutinates to release the volatiles from particle surfaces of the regolith.

13. The lunar regolith processing system of claim 1, wherein the mill comprises:

a mesh screen having a mesh cylindrical sidewall;

an inner chamber disposed inside the mesh cylindrical sidewall; and a rotating assembly having a vertical rotational axis that is perpendicular to the lunar surface, the rotating assembly including a rotatable vertical shaft and blades fixed to and configured to rotate with the rotatable vertical shaft, and wherein the rotating assembly and the mesh screen are configured such that rotation of the vertical shaft causes the blades to agitate fine particles in the portion of the extracted regolith to release the volatiles from surfaces of the fine particles, and causes the mesh screen to:

sort particles in the portion of the extracted regolith having a size greater than a limit size from the fine particles in the portion of the extracted regolith, and allow particles in the portion of the extracted regolith having a size less than or equal to the limit size to pass through the mesh screen.

14. A method of processing lunar regolith, comprising:

extracting regolith from a lunar surface;

conveying a portion of the extracted regolith including rock fragments and finely crushed particles to a mill;

operating the mill to agitate the portion of the extracted regolith, without applying heat to the portion of the extracted regolith, such that the agitation of the portion of the extracted regolith releases volatile gases including hydrogen, helium-3, and helium-4 from the portion of the extracted regolith; and conveying the volatile gases from the mill to a refinery.

15. The method of claim 14, further comprising:

operating the refinery to separate the helium-3 from a remainder of the volatile gases.

16. The method of claim 15, further comprising:

pumping the released volatile gases from the mill to the refinery using a vacuum pump.

17. The method of claim 16, further comprising:

flowing a diluent gas to the mill to increase gas pressure in the mill during the pumping of the released volatile gases from the mill to the refinery.

18. The method of claim 14, further comprising:

flowing the released volatile gases to a condenser in the refinery through an evaporative heat exchanger in the refinery;

separating, using the condenser, helium-3 in gaseous form from the hydrogen and the helium-4 by condensing the hydrogen and the helium-4 to hydrogen liquid and helium-4 liquid;

flowing the hydrogen liquid and the helium-4 liquid through the evaporative heat exchanger to cool additional released volatile gases that are released by an operation of the mill subsequent to the release of the volatile gases; and flowing the cooled additional released volatile gases to the condenser.

19. The method of claim 14, further comprising:

flowing the released volatile gases and stored volatile liquids through an evaporative heat exchanger in the refinery such that the released volatile gases are cooled by the stored volatile liquids;

flowing the cooled released volatile gases from the evaporative heat exchanger to the condenser; and separating, using the condenser, the helium-3 in gaseous form from the hydrogen and the helium-4 by condensing the hydrogen and the helium-4 to liquid hydrogen and liquid helium-4.

20. A lunar regolith processing system, comprising:

an excavator configured to extract regolith from a lunar surface;

a mill configured to receive a portion of the extracted regolith from the excavator, and agitate the portion of the extracted regolith such that the agitation of the portion of the extracted regolith releases volatile gases including hydrogen, helium-3, and helium-4 from the portion of the extracted regolith;

a refinery; and a vacuum pump configured to pump the released volatile gases from the mill to the refinery, wherein the lunar regolith processing system is configured to flow a diluent gas to the mill to increase gas pressure in the mill during the pumping of the released volatile gases from the mill to the refinery.

* * * * *